United States Patent [19]

Ookubo et al.

[11] 4,305,309

[45] Dec. 15, 1981

[54] DRIVE CONDITION CHANGEOVER APPARATUS FOR A TRANSFER UNIT

[75] Inventors: Takashi Ookubo; Yukiyoshi Sasabe, both of Yokohama; Kiyotaka Ozaki, Yokosuka, all of Japan

[73] Assignee: Nissan Motor Co., Ltd., Yokohama, Japan

[21] Appl. No.: 107,598

[22] Filed: Dec. 27, 1979

[30] Foreign Application Priority Data

Dec. 29, 1978 [JP] Japan ............................. 53-164227

[51] Int. Cl.³ .................. G05G 5/10; G05G 9/12; B60K 17/34
[52] U.S. Cl. ................................. 74/477; 74/339; 74/470; 74/473 R; 180/247; 192/109 A
[58] Field of Search .............. 74/339, 470, 473 R, 74/477; 180/247; 192/109 A

[56] References Cited

U.S. PATENT DOCUMENTS

| | | | |
|---|---|---|---|
| 2,019,073 | 10/1935 | Cooper et al. | 74/339 X |
| 2,224,322 | 12/1940 | Sinclair | 74/339 X |
| 3,283,298 | 11/1966 | Kaiser | 180/247 X |
| 3,354,741 | 11/1967 | Johnston, Jr. et al. | 74/477 |
| 3,529,487 | 9/1970 | Dolan | 180/247 X |
| 3,747,425 | 7/1973 | MacDonald | 74/477 |

*Primary Examiner*—Allan D. Herrmann
*Attorney, Agent, or Firm*—Thompson, Birch, Gauthier & Samuels

[57] ABSTRACT

Transfer unit includes a shift rod which is slidably supported at both ends in a transfer case and is adapted to cooperate with a shift fork to effect changeover between two wheel and four wheel drive conditions. The shift fork is supported by the shift rod so as to be movable in both shift directions and is resiliently retained in position on the shift rod.

2 Claims, 6 Drawing Figures

DRIVE CONDITION CHANGEOVER APPARATUS FOR A TRANSFER UNIT

BACKGROUND OF THE INVENTION

This invention relates to a drive condition changeover apparatus for a transfer unit including a shift rod which is slidably supported in a transfer case and adapted to cooperate with a shift fork to effect changeover between two wheel and four wheel drive conditions.

Generally, a transfer unit receives vehicle engine power through a transmission mechanism and performs such functions as to drive the vehicle in high or low speed drive condition, to interrupt power transmission to drive wheels, and/or to effect changeover between two wheel and four wheel drive conditions.

In a known drive condition changeover apparatus disclosed in the Japanese Utility Model Application Publication No. 16,752/78, when the transfer unit is operated to shift from two wheel and four wheel drive condition, even though the coupling sleeve at first cannot move to the four wheel drive side by collision between teeth which are to be meshed with each other, the coupling sleeve can be displaced after waiting for meshing between the teeth. However, the waiting mechanism cannot operate when the transfer unit is shifted from four wheel and two wheel drive condition. Thus, the shifting operation is not always easy. Further, the waiting mechanism is exposed outside the transfer case, so that a special lubrication system must be provided other than the ordinary one for the transfer case. Also, as the shift rod is connected with the shift fork at one end, and with the waiting mechanism at the other end, the shift rod must be cantilever supported at the middle portion by the transfer case. Thus, a large bending force is applied to the middle portion of the shift rod during the shifting operation, acting as a large frictional resistance. Spring means provided in the waiting mechanism to displace the shift rod must be strong enough to overcome the frictional resistance, and shift operation force of the operation lever must be sufficiently strong to overcome the spring force.

SUMMARY OF THE INVENTION

The object of the present invention is to provide an improved changeover apparatus for a transfer unit which eliminates the disadvantages of the known apparatus.

The changeover apparatus for a transfer unit, according to the present invention, is characterized in that both ends of the shift rod are supported by the transfer case, the shift fork is supported by the shift rod so as to be movable in both shift directions, and the shift fork is resiliently retained at a predetermined position on the shift rod.

The waiting mechanism of the present invention is combined with the ordinary shift elements of the transfer unit so as to be operable to both directions, and is arranged in the transfer case. Thus, the shifting operation can be facilitated. Further, bending torque applied to the shift rod is not high enough to cause excessive frictional resistance.

According to one embodiment of the present invention, the shift fork has a cylindrical member enclosing a portion of the shift rod, annular spacers are inserted between both end portions of the cylindrical member and the shift rod, and are movable only inwardly against spring force, and the shift rod is adapted to move one of the spacers inwardly when the shift rod is shifted axially.

One preferred embodiment of the changeover apparatus according to the present invention, by way of example, will now be described with reference to the accompanying drawings.

DETAILED EXPLANATION OF THE PREFERRED EMBODIMENT

Figure 1:
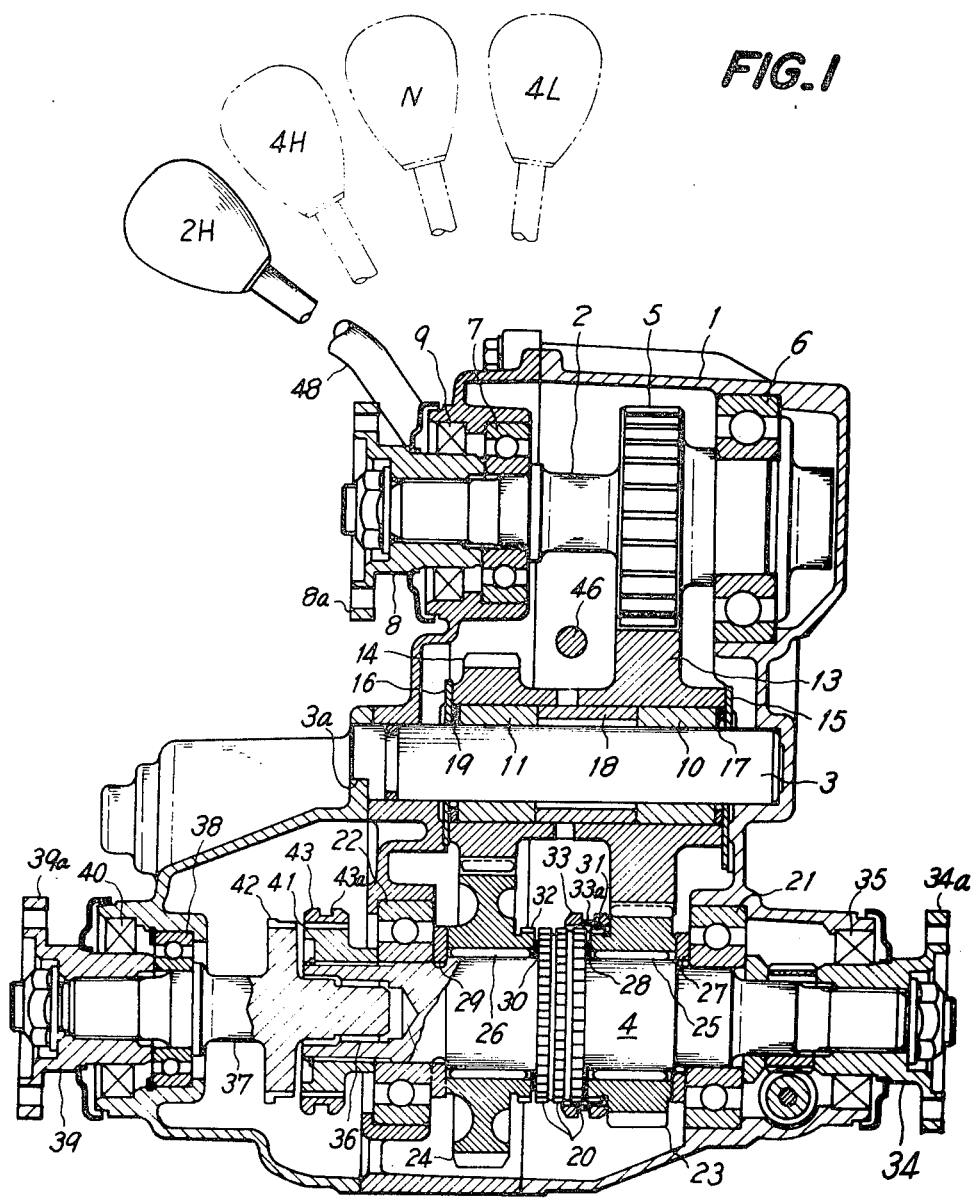
FIG. 1 is a longitudinal-sectional view of a transfer unit incorporating the changeover apparatus according to the present invention.
Figure 2:
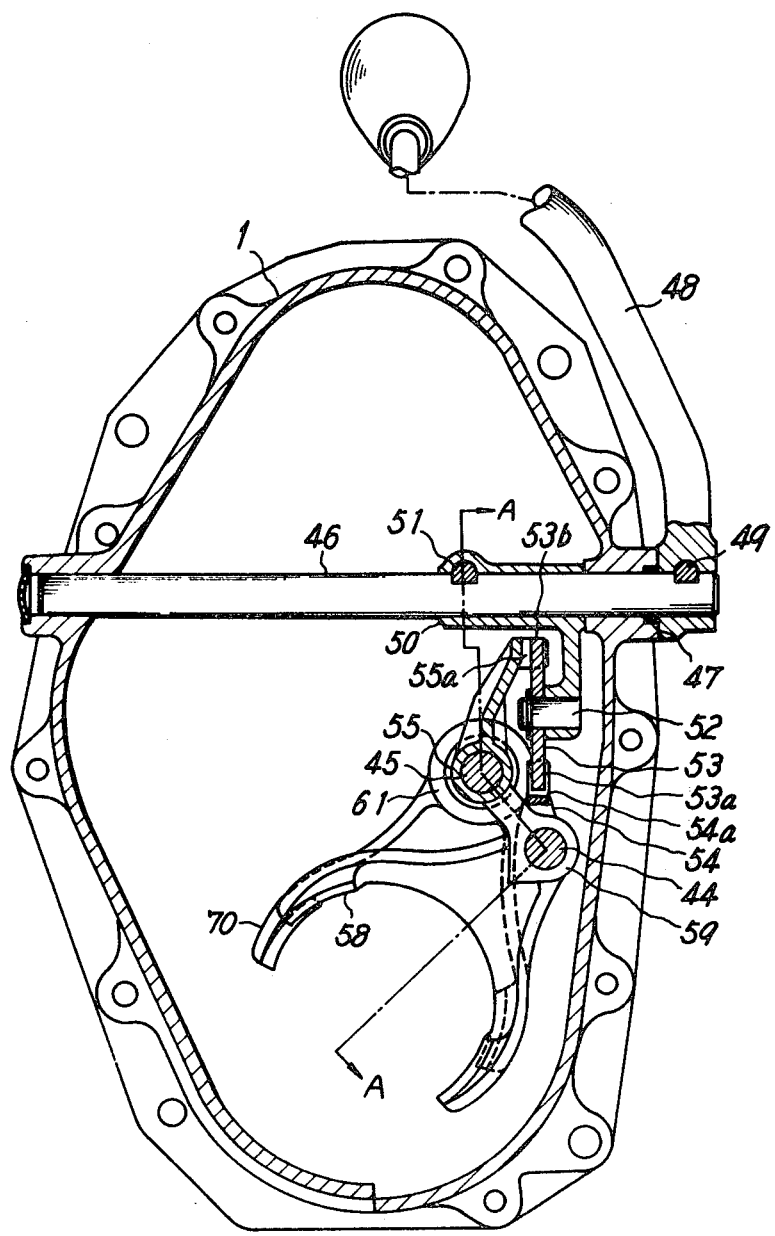
FIG. 2 is a cross-sectional view of the unit shown in FIG. 1, with the power transmission mechanism removed for a better understanding.
Figure 3:
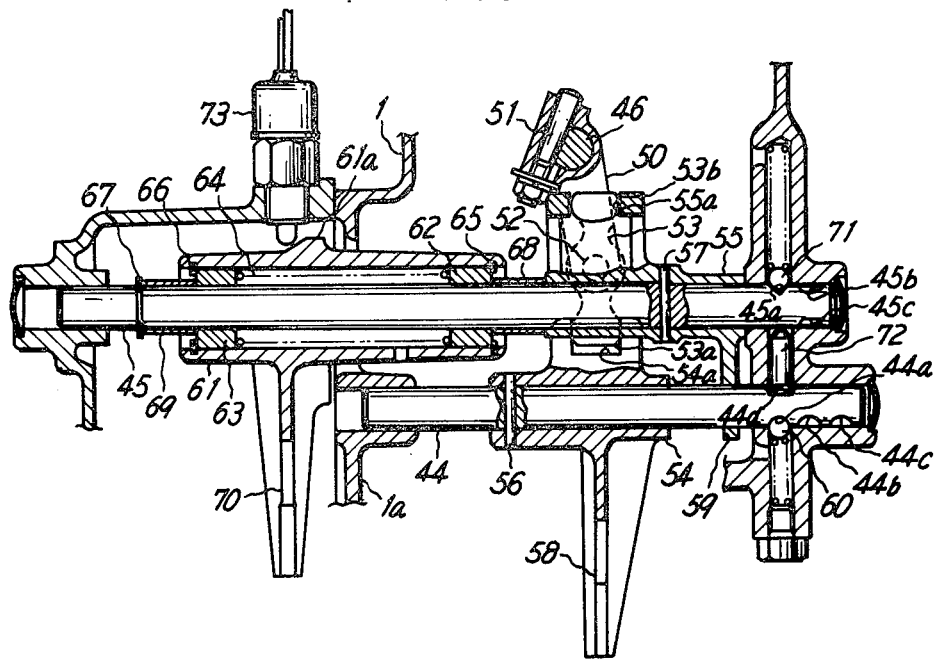
FIG. 3 is a sectional view taken along the line A—A of FIG. 2.

Referring now to FIGS. 1 to 3, reference numeral 1 designates a transfer case, in which an input shaft 2, an idler shaft 3 and an output shaft 4 are arranged in parallel with each other, as shown in FIG. 1. The input shaft 2 is integrally formed with an input gear 5 at its central portion, and is rotatably supported at its both ends by bearings 6 and 7. One end of the input shaft 2 projects out of the transfer case 1 and a cylindrical input member 8, having on one end a flange 8a, is secured with the projected end of the input shaft 2. An oil seal 9 is inserted between the outer periphery of the input member 8 and the transfer case 1 to prevent leakage of the lubricant in the transfer case 1. The input shaft 2 receives power through the flange 8a which is connected with an output shaft of a transmission, not shown, which transmits power at a selected reduction ratio from a prime mover, e.g., an engine not shown.

The idler shaft 3 has at one end a flat recess 3a which engages with a corresponding flat portion of the transfer case 1, so as to retain the idler shaft 3 against rotation. A large idler gear 13 and a small idler gear 14 are rotatably supported by the idler shaft 3 through bearings 10 and 11, respectively. The idler gears 13 and 14 are formed as an integral body which is axially positioned by thrust plates 15 and 16 at both ends. The idler gear 13 meshes with the input gear 5. The bearings 10 and 11 are axially positioned by spacers 17, 18 and 19 between the thrust plates 15 and 16.

The output shaft 4 has integrally formed output gears 20 at central position and is rotatably supported by the transfer case 1 at both ends through bearings 21 and 22. A small diameter drive gear 23 and a large diameter drive gear 24 are rotatably supported by the output shaft 4 through needle bearings 25 and 26 at both sides of the output gears 20. The axial positions of the drive gears 23 and 24 are determined by spacers 27 and 28; and 29 and 30; respectively. The idler gear 13 meshes with the drive gear 23, while the idler gear 14 meshes with the drive gear 24. The drive gears 23 and 24 are integrally formed with clutch gears 31 and 32 on their end surfaces, and the clutch gear diameters are the same as those of the output gears 20 and the clutch gears are adjacent to the output gears 20. A coupling sleeve 33 engages with the output gears 20 by means of a sliding movement in the axial direction. The width of the coupling sleeve is generally the same as, or slightly less than the sum of the widths of the output gears 20. The coupling sleeve 33 is axially movable between a high speed position engaging with the output gears 20 and the clutch gear 31 as shown in FIG. 1, a neutral position engaging only with the output gears 20, and a low speed position engaging with the output gears 20 and the clutch gear 32. At the high speed position, rotation of the input gear 5 is transmitted through the idler gear 13, the drive gear 23, the clutch gear 31, the coupling sleeve 33, the output gears 20 to the output shaft 4. At the low speed position, rotation of the input gear 5 is transmitted through the idler gear 13, idler gear 14, drive gear 24, clutch gear 32, coupling sleeve 33, output gears 20 to the output shaft 4. By the speed reduction between the gears 14 and 24, rotation speed of the output shaft 4 is reduced at the low speed position.

One end of the output shaft 4 projects out of the transfer case 1, and is integrally secured to an output member 34 formed on its end with a flange 34a, which may be connected with a propeller shaft, not shown, which drives a differential gear unit for the rear wheels and acts as a normal drive source. An oil seal 35 prevents leakage of the lubricant between the output member 34 and the transfer case. 1. The other end of the output shaft 4 coaxially supports, through a needle bearing 36, one end of another output shaft 37. The other end of the output shaft 37 is rotatably supported by a bearing 38 mounted in the transfer case 1, and projects out of the transfer case 1. A second output member 39 formed with a flange 39a is integrally secured to the projected end of the output shaft 37, and may be connected with a propeller shaft which drives a differential unit for the front wheels acting as drive wheels in the four wheel drive condition. An oil seal 40 is inserted between the outer periphery of the output member 39 and the transfer case 1 to prevent leakage of the lubricant.

At the left end of the output shaft 4 shown in FIG. 1, a clutch gear 41 is spline connected and is held in position by a snap ring. A clutch gear 42 is formed integrally with the output shaft 37. The clutch gears 41 and 42 are coaxial and have the same diameter. Those gears 41 and 42 are engageable with a coupling sleeve 43 which is axially slidable along the gears 41 and 42. The coupling sleeve 43 is adapted to slide between a two wheel drive position shown in FIG. 1 engaging with the clutch gear 41 only, and a four wheel drive position engaging with both of the clutch gears 41 and 42.

As shown in FIGS. 2 and 3, two shift rods 44 and 45 are axially slidably supported in the transfer case 1 and are parallel with the shafts 2, 3 and 4. A cross rod 46 is rotatably supported in the transfer case 1 and extends perpendicular to the shift rods 44 and 45. One end of the shift rod 44 is supported by a partition wall 1a in the transfer case 1. One end of the cross rod 46 projects out of the transfer case 1 and is connected to a hand operation lever 48 by a cotter pin 49. An O-ring 47 seals the clearance between the cross rod 46 and the transfer case 1. In the transfer case 1, the cross rod 46 is secured to a shift lever 50 by a cotter pin 51. As the transfer case 1 is positioned between opposite end faces of the operating lever 48 and the shift lever 50, the cross rod 46 is prevented from axial movement.

The free end of the shift lever 50 is provided with a pin 52 which pivotably supports the central portion of a rocking plate 53. Both ends 53a and 53b of the rocking plate 53 are rounded and engaged by rectangular recesses 54a and 55a of shift sleeves 54 and 55, respectively. The sleeves 54 and 55 are fitted with, and secured to the shift rods 44 and 45 by, pins 56 and 57, respectively. The sleeve 54 is integrally formed with a shift fork 58. The sleeve 55 is integrally formed with an arm 59 (FIG. 3) which extends to and slidably engages with the shift rod 44. The arm 59, sleeve 55 and pin 57 hold the shift rod 45 against rotation. The shift fork 58 engages with an outer peripheral groove 33a of the coupling sleeve 33 shown in FIG. 1, and shifts the coupling sleeve 33 to the high speed, neutral and low speed positions. The shift rod 44 is formed with recesses 44a, 44b and 44c which engage with a check ball 60 at the high speed, neutral and low speed positions of the shift rod 44, respectively. As the shift fork 58 engages with the coupling sleeve 33, the shift rod 44 is held against rotation.

The shift rod 45 slidably supports a cylindrical member 61 through annular spacers 62 and 63 which are slidable relative to the shift rod 45 and the member 61. Between the annular spacers 62 and 63, a compression spring 64 is arranged in the member 61 to urge the spacers 62 and 63 against snap rings 65 and 66 which engage with the inner surface of the member 61 at both end portions thereof. A sleeve 68 is inserted between the shift sleeve 55 and the annular spacer 62, and a sleeve 69 is inserted between the annular spacer 63 and a snap ring 67 which engages in an annular recess on the shift rod 45. Thus, the cylindrical member 61 is resiliently retained at a predetermined axial position on the shift rod 45. The cylindrical member 61 is integrally formed with a shift fork 70 which engages with outer peripheral recess 43a of the coupling sleeve 43 shown in FIG. 1. As the shift rod 45 moves axially, the shift fork 70 shifts the coupling sleeve 43 to the two wheel drive position or to the four wheel drive position. The shift rod 45 is formed with recesses 45a and 45b which engage with a check ball 71 at the two wheel and four wheel drive positions, respectively.

As shown in FIG. 3, an interlock pin 72 provided in the wall of the transfer case is perpendicular to and slidable between the shift rods 44 and 45. The shift rod 44 is formed with a recess 44d which engages with one end of the interlock pin 72 when the shift rod 44 is shifted to the high speed position, as shown in FIG. 3. The shift rod 45 is formed with a recess 45c which is of the same depth as the recess 44d and engages with the other end of the interlock pin 72 when the shift rod 45 is shifted to the four wheel drive position. The length of the interlock pin 72 is equal to the sum of the depth of the recess 44d or 45c and the distance between the shift rods 44 and 45 so that at least one of the recesses 44d and 45c is engaged with the interlock pin 72. Thus, when the two wheel drive position is selected as shown in FIG. 3, only the high speed position can be selected by the shift rod 44.

A switch 73 for detecting the four wheel drive condition is mounted on the transfer case 1, and is actuated by a projection 61a on the cylindrical member 61. When the shift rod 45 is shifted toward the left in FIG. 3 from the two wheel drive position shown in FIG. 3, the cylindrical member 61 and the projection 61a also move left to actuate the detecting switch 73. Thus, a lamp in the driver's area indicates that the vehicle is driven in the four wheel drive condition.

Operation of the above described transfer unit having the changeover apparatus according to the present invention will be described hereinafter by referring to FIGS. 3 to 6. When the vehicle is running on normal road, the driver maintains the operating lever 48 at 2H position shown by the solid line in FIG. 1. As shown in FIG. 3, the shift rod 44 is in the extreme right position where the check ball 60 engages with the recess 44a, and the shift rod 46 is also in the extreme right position where the check ball 70 engages with the recess 45a. The lower end of the interlock pin 72 engages with the recess 44d of the shift rod 44. When the shift rods 44 and 45 are in their extreme right positions, the shift forks 58 and 70 so position the coupling sleeves 33 and 43, as shown in FIG. 1, that the coupling sleeve 33 connects the output gears 20 with the clutch gear 31 while the coupling sleeve 43 meshes only with the clutch gear 41 to interrupt power transmission between the output shafts 4 and 37. Thus, power transmitted from the transmission to the input shaft 2 is further transmitted through the input gear 5, idler gear 13, drive gear 23, clutch gear 31, coupling sleeve 33, output gears 20 and the output shaft 4 to the rear two wheels, to drive the vehicle in the high speed two wheel drive condition.

When the vehicle is to be driven on muddy or off-road ground, the driver shifts the operating lever 48 from the position 2H to the next position 4H shown in FIG. 1. The cross rod 46 and the shift lever 50 rotate clockwisely from the position shown in FIG. 3 to the position shown in FIG. 4. As the shift rod 44 is prevented from shifting by interengagement between the recess 44d and the interlock pin 72, the shift rod 44 is not capable of following the rotation of the shift lever 50 which causes a counterclockwise rotation of the rocking plate 53 through the pin 52 and about the upper end 53a. Thus, the rocking plate 53 shifts the shift sleeve 55 and the shift rod 45 from the position shown in FIG. 3 toward the left to the position shown in FIG. 4. The snap ring 67 on the shift rod 45 then contacts with the transfer case 1, and the check ball 71 engages with the recess 45b. The shift rod 45 maintains the new position in which the upper end of the interlock pin 72 aligns with the recess 45c. As the shift rod 45 moves toward the left, the sleeve 68 and the spacer 62 compress the spring 64 which urges through the spacer 63 the shift fork 70 to the extreme left position. By this, the coupling sleeve 43 is moved toward the left in FIG. 1 to mesh with the clutch gears 41 and 42. If the internal teeth of the coupling sleeve 43 and the external teeth of the clutch gear 42 interfere with each other, the shift fork 70 cannot move the coupling sleeve 43 toward the left. Thus, as shown by solid lines in FIG. 4, the shift fork 70 and the cylindrical member 61 remain in their original positions shown in FIG. 3. In this case, the shift rod 45, shift sleeve 55 and the sleeve 68 integrally move toward the left against the spring 64, without disturbing the movement of the operating lever 48 from the 2H position to the 4H position. After the operating lever 48 is moved to the 4H position, even though the driver releases his hand from the operating lever 48, the shift rod 45 is held in the extreme left position by engaging the check ball 71 with the recess 45b against the force of the spring 64 acting toward the right. The shift fork 70 waits for shifting to the 4H position by the force of the spring 64 acting toward the left.

As the relative rotation between the output shafts 4 and 37 releases interference between the internal teeth of the coupling sleeve 43 and the external teeth of the clutch gear 42, the force of the spring 64 is transmitted through the annular spacer 63, snap ring 66, cylindrical member 61 and the shift fork 70 to the coupling sleeve 43. Thus, the coupling sleeve 43 moves toward the left from the position shown in FIG. 1, and meshes with the clutch gears 41 and 42, to connect the output shaft 37 with the output shaft 4. The positions of the cylindrical member 61 and the shift fork 70 relative to the shift rod 45 is the same as that shown in FIG. 3 and by the phantom line in FIG. 4. By this, the shift is completed and power from the output shaft 4 is transmitted through the output shaft 37 to the front wheels, so that the vehicle is driven in the high speed four wheel drive condition.

Figure 4:
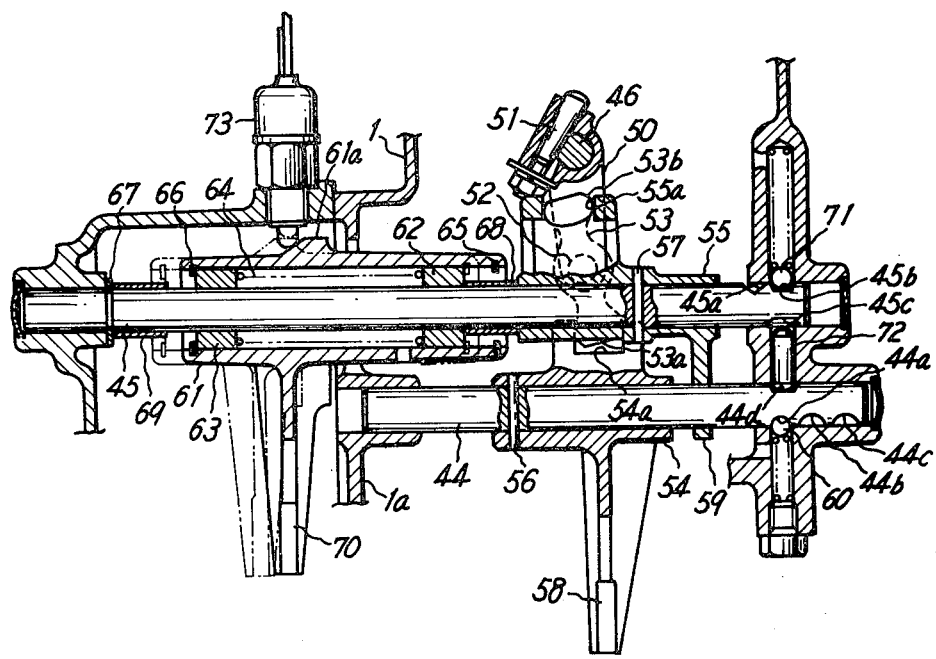
FIGS. 4 to 6 are sectional views similar to FIG. 3 and showing various shift positions.
Figure 5:
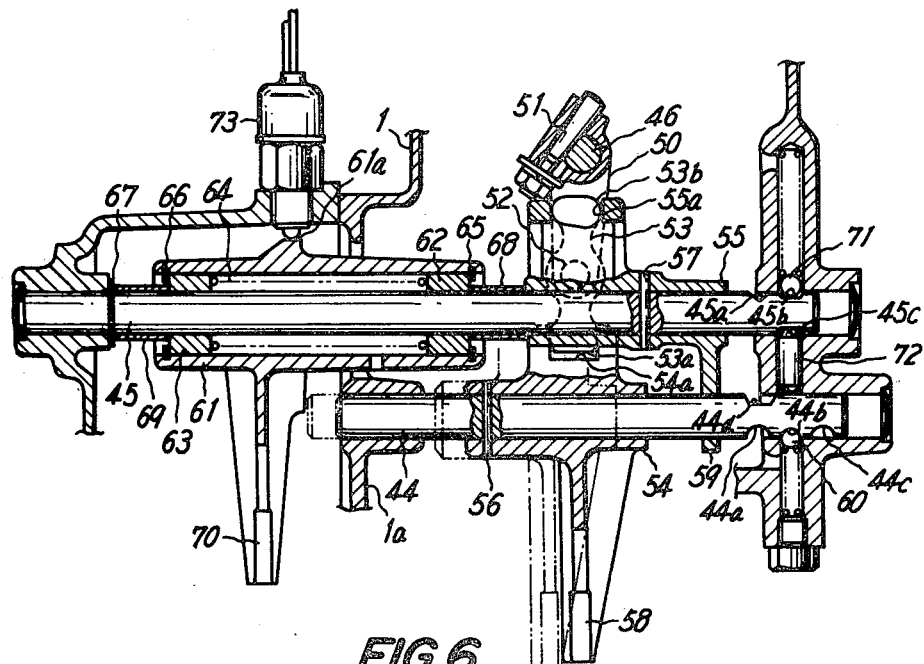
Figure 6:
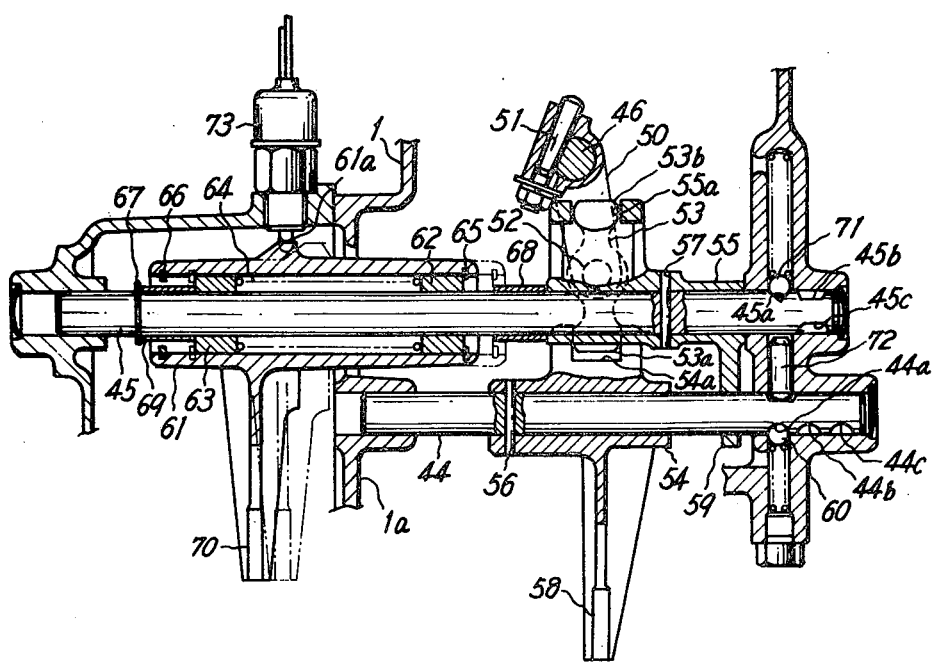

When the operation lever 48 is shifted from the position 4H to the next position N shown in FIG. 1, the shift lever 50 is rotated by the cross rod 46 clockwisely from the position shown in FIG. 4 to a position shown in FIG. 5. Since the snap ring 67 and the transfer case 1 are in abutting engagement, the shift rod 45 cannot any more follow the rotation of the shift lever 50 which causes a clockwise rocking of the rocking plate 53 through the pin 52 and about the end 53b. As shown in FIGS. 4 and 5, as the end portion 53b of the rocking plate 53 is retained by the recess portion 55a of the shift sleeve 55, the end portion 53a of the rocking plate 53 displaces the shift sleeve 54 and the shift rod 44 toward the left to the position shown by solid line in FIG. 5. The shift rod 44 displaces the interlock pin 72 from the recess 44d so that the other end of the interlock pin 72 engages with the recess 45c of the shift rod 45. The shift rod 44 is then retained in position by engagement between the recess 44b and the check ball 60. As the shift rod 44 moves toward the left, the shift fork 58 displaces the coupling sleeve 33 from the position shown in FIG. 1 toward the left to disengage the coupling sleeve 33 from the clutch gears 31 and 33. Thus, power from the input shaft 2 is not transmitted to the output shaft 4 so that neutral condition is obtained to stop the vehicle.

When the operation lever 48 is shifted from the position N to the next position 4L shown in FIG. 1, the shift lever 50 rotates clockwisely from the position shown in FIG. 5. With the operation similar to that for obtaining the neutral position, the rotation of the shift lever 50 causes further rocking of the rocking plate 53 which displaces the shift sleeve 54 and the shift rod 44 toward the left from the position shown by solid line to the position shown by phantom line in FIG. 5. By this displacement, the check ball 60 engages into the recess 44c of the shift rod 44, and the shift fork 58 displaces the coupling sleeve 33 further toward the left from the neutral position to a position in which the coupling sleeve 33 engages with the clutch gear 32 of the drive gear 24. Thus, power is transmitted through the idler gear 13, idler gear 14, drive gear 24, clutch gear 32, coupling sleeve 33 and the output gears 20 to the output shaft 4, to effect power transmission at low speed compared with the positions 2H and 4H. As the coupling sleeve 43 connects the output shaft 4 with the output shaft 37 as previously stated, the vehicle is driven in low speed four wheel drive condition which is suitable for climbing steep uphill at high torque or for driving on irregular ground.

To changeover from the four wheel to two wheel drive condition, the driver shifts the operating lever 48 from the position 4H to the position 2H shown in FIG. 1. The cross rod 46 and the shift lever 50 rotate counterclockwisely from the position shown in FIG. 4 to the position shown in FIG. 6 which is identical with that shown in FIG. 3. As described previously, when the operation lever 48 is shifted to the position 4H to obtain the high speed four wheel drive condition, the coupling sleeve 33 contacts with the end surface of the drive gear 23 and cannot further move toward the right. Thus, the shift fork 58 and the shift rod 44 are also retained in the position shown in FIG. 4 or 6. Thus, the counterclockwise rotation of the shift lever 50 causes through the pin 52 the clockwise rocking of the rocking plate 53 about the retained end portion 53a from the position shown in FIG. 4. Thus, the shift sleeve 55 together with the shift rod 45 is displaced to the extreme right position shown in FIG. 6 where the right end surface of the shift sleeve 55 contacts with the transfer case 1. The movement toward the right of the shift rod 45 tends to urge the cylindrical member 61 and the shift fork 70 rightwardly to release the coupling sleeve 43 from the output shaft 37. But, in case the vehicle is running along a steep curve, twist torque caused by the speed difference between inner front and rear wheels is applied between the output shafts 4 and 37, and the twist torque retains the coupling sleeve 43 from moving to its released position. Thus, the shift fork 70 and the cylindrical member 61 are retained in the four wheel drive position as shown by solid line in FIG. 6 or by phantom line in FIG. 4. In this case, the shift rod 45 moves to the extreme right position and displaces the snap ring 67, sleeve 69 and the annular spacer 63 toward the right against the spring 64, so that the operation lever 48 can be shifted to the position 2L. After the shifting operation, the shift rod 45 is retained by engagement of the check ball 71 with the recess 45a against the reaction force of the spring 64. Thus, the driver can release his hand from the operating lever 48. The shift fork 70 urged by the spring 64 waits for a shiftable condition to release the output shaft 37 to thereby obtain the two wheel drive condition.

When the vehicle is now running on a straight road, the twist torque between the output shafts 4 and 37 becomes zero, so that the coupling sleeve 43 can slide along the clutch gears 41 and 42 to be disengaged from the clutch gear 42. Compression force of the spring 64 is transmitted through the annular spacer 62, snap ring 65, cylindrical member 61 and the shift fork 70 to the coupling sleeve 43, and the coupling sleeve 43 moves toward the right from the four wheel drive position to the two wheel drive position shown in FIG. 1. In this case, the cylindrical member 61 and the shift fork 70 also move toward the right relative to the shift rod 45 to the position shown in FIG. 3 and also shown by phantom line in FIG. 6. Now the vehicle is capable of driving in the high speed two wheel driving condition.

It will be appreciated that, since the changeover apparatus for a transfer unit according to the present invention is provided with a waiting mechanism which comprises the cylindrical member 61, annular spacers 62 and 63, spring 64, snap rings 65 to 67 and the sleeves 68 and 69, the waiting mechanism operates positively when the changeover is effected from the two wheel driving condition to the four wheel driving condition, and also from the four wheel to the two wheel driving condition. Thus, operability of the transfer unit is remarkably improved. As the waiting mechanism is arranged on the shift rod 45 which is supported at both ends by the transfer case 1, lubricant for the transfer case can be utilized to lubricate the waiting mechanism. Thus, a specific lubrication system for the waiting mechanism is unnecessary. As the urging force of the waiting mechanism is applied axially to the shift rod 45 which is supported at both ends, and as the cylindrical member is supported by spaced annular spacers 62 and 63, bending force applied to the supported ends of the shift rod 45 is relatively small. Thus, the force of the spring 64 can be made small and the operation force of the operation lever 48 can be also decreased.

What is claimed is:

1. A drive condition changeover apparatus for a transfer unit, comprising:
   (a) a transfer case;
   (b) a cross rod rotatably supported in the transfer case and having one end which projects out of the transfer case;
   (c) a hand operation lever secured to said one end of the cross rod;
   (d) a pair of shift rods mounted entirely within the transfer case, said shift rods extending parallel to each other and extending perpendicular to the cross rod, each said shift rod being axially slidably supported at both of its ends in the transfer case;
   (e) an interlock member preventing both of the pair of shift rods from axially sliding simultaneously, said interlock member permitting a selected one of the shift rods to axially slide;
   (f) a shift lever mounted within the transfer case and secured to the cross rod;
   (g) a rocking plate mounted within the transfer case, said rocking plate having a central portion which is pivotably supported by the shift lever, said rocking plate having a pair of end portions respectively engaging the pair of shift rods;
   (h) a first shift fork supported by one of the shift rods, said first shift fork effecting changeover between four wheel low speed drive condition, neutral condition and four wheel high speed drive condition; and
   (i) a second shift fork supported by the other of the shift rods, said second fork effecting changeover between four wheel high speed drive condition and two wheel high speed drive condition, said second shift fork being resiliently retained at a predetermined position on the other of the shift rods, and being movable with respect to the other of the shift rods in both axial directions thereof.

2. An apparatus as claimed in claim 1, further having a cylindrical member telescopically enclosing a portion of the other of the shift rods, annular spacers inserted within both end portions of said cylindrical member and on the other of the shift rods, a spring telescopically disposed within said cylindrical member and on the other of the shift rods, said annular spacers mounted so as to be movable only inwardly of said cylindrical member against the resilient force of said spring, the other of the shift rods associated with means for moving one of said annular spacers inwardly within said cylindrical member when shifted axially.

* * * * *